(12) United States Patent
Helf et al.

(10) Patent No.: US 10,813,501 B2
(45) Date of Patent: Oct. 27, 2020

(54) FLOWABLE FOOD HEATING WITH BURNING PREVENTION

(71) Applicant: NESTEC S.A., Vevey (CH)

(72) Inventors: Gerd Helf, Heiden (DE); Harald Klotzbach, Kamp-Lintfort (DE); Alessandro Molinaro, Lausanne (CH); Bo Su, Essen (DE)

(73) Assignee: Societe des Produits Nestle S.A., Vevey (CH)

( * ) Notice: Subject to any disclaimer, the term of this patent is extended or adjusted under 35 U.S.C. 154(b) by 222 days.

(21) Appl. No.: 16/060,230

(22) PCT Filed: Dec. 12, 2016

(86) PCT No.: PCT/EP2016/080579
§ 371 (c)(1),
(2) Date: Jun. 7, 2018

(87) PCT Pub. No.: WO2017/098037
PCT Pub. Date: Jun. 15, 2017

(65) Prior Publication Data
US 2018/0368621 A1    Dec. 27, 2018

(30) Foreign Application Priority Data

Dec. 11, 2015 (EP) .................................... 15199558

(51) Int. Cl.
*A47J 27/00* (2006.01)
*A47J 43/046* (2006.01)
*A47J 43/07* (2006.01)

(52) U.S. Cl.
CPC ......... *A47J 43/0465* (2013.01); *A47J 27/004* (2013.01); *A47J 43/0722* (2013.01)

(58) Field of Classification Search
CPC ... A47J 43/0465; A47J 43/0722; A47J 27/004
See application file for complete search history.

(56) References Cited

U.S. PATENT DOCUMENTS

| 4,802,407 A * | 2/1989 | Negri ..................... A01J 25/001 |
| | | 99/453 |
| 7,669,517 B2 * | 3/2010 | Boussemart .......... A47J 27/004 |
| | | 99/287 |

(Continued)

FOREIGN PATENT DOCUMENTS

WO     2011110870      9/2011

*Primary Examiner* — Ryan J. Walters
(74) *Attorney, Agent, or Firm* — K&L Gates LLP

(57) ABSTRACT

The method prevents or inhibits, during a heating process, burning in a food heating device (20) of a flowable food substance against a heating surface (6) delimiting or contained in a device's cavity (21) that contains the food substance. The heating device comprises an agitator (4) movable in the cavity (21). The method includes the steps of: introducing the flowable food substance into the cavity (21); heating the heating surface (6) and moving the agitator (4) at an agitator speed (41,42) to generate in the cavity (21) a flow of the food substance over the heating surface (6) and in contact therewith; and disturbing the flow of the food substance to break and/or causing asymmetric flow of the food substance in the cavity (21). At a first agitator speed (41) during the heating process, the food substance is caused to flow at different first relative local speeds over the heating surface (6) that includes a first minimum speed location (61) over which the food substance flows at a first minimum speed of the different first relative local speeds. The speed of the agitator (4) is changed during the heating process to a second speed (42), the food substance being caused to flow at different second relative local speeds over the heating surface (6) that includes a second minimum speed location (62) over which the food flows at a second minimum speed of the different second relative local speeds. The second minimum speed location (62) is different to the first minimum speed location (61).

19 Claims, 2 Drawing Sheets

(56) References Cited

U.S. PATENT DOCUMENTS

2011/0203462 A1  8/2011  Boussemart et al.
2013/0064941 A1* 3/2013  Taitler .................... A47J 43/10
                                                  426/231

* cited by examiner

FLOWABLE FOOD HEATING WITH BURNING PREVENTION

CROSS REFERENCE TO RELATED APPLICATIONS

The present application is a National Stage of International Application No. PCT/EP2016/080579, filed on Dec. 12, 2016, which claims priority to European Patent Application No. 15199558.6, filed on Dec. 11, 2015, the entire contents of which are being incorporated herein by reference.

FIELD OF THE INVENTION

The field of the invention pertains to the heating and optionally homogenising and/or frothing a flowable food substance, such as heating milk or a milk-containing substance. The heating is carried out with the aid of an agitator, e.g. a whisk or mixer or other impeller, for imparting a mechanical effect to the food substance.

BACKGROUND ART

Specialty beverages in which at least a portion is made up of frothed or heated milk are becoming more and more popular. The best-known beverage of this type is a coffee of the cappuccino type. It comprises a liquid portion consisting of coffee topped by a layer of frothed milk which, because of its very much lower density, floats atop the surface of the liquid. In general, preparing one takes time, manipulation operations and cleaning.

The most customary way of preparing a milk-based froth is to pour the desired amount of milk into the container, immerse a steam outlet pipe from a coffee machine in the container, agitating it up and down to introduce the air needed to form the froth.

There also exists mechanical stirring appliances which are usually intended for domestic use for beating froth from more or less viscous food products such as eggs, ice, juices or the like. These appliances are usually ill-suited to froth the microbiologically sensitive liquids such as milk. Regular cleaning of the tank of the appliance needs to be envisaged in order to remove any solid food residue. In addition, heating the milk has a tendency to increase the extent to which cooked or burnt proteins are deposited on and adhere to the surfaces. The existing appliances are not, for the most part, well suited to reducing the encrustation of this solid residue, making cleaning troublesome. These appliances also have a stirring and drive mechanism which is fixed and intrudes into the tank, and this presents several disadvantages: the removal/refitting time is not insignificant, they have a tendency to become soiled more quickly, they entail additional cost as a result of the multiplicity of components, and the stirring means are difficult to clean.

U.S. Pat. No. 6,318,247 relates to an appliance for preparing hot beverages or food with stirring such as hot chocolate, for example. Other devices for stirring food products are described in patent documents WO 2004/043213, DE 89 15 094, DE 196 24 648, U.S. Pat. No. 2,932,493, DE 1 131 372, U.S. Pat. Nos. 3,356,349, 4,537,332 and 6,712,497. Improved appliances for preparing froth from a milk-based liquid or milk has been proposed in WO 2006/050900, WO 2008/142154, WO 2009/074555, WO 2010/023313, WO 2011/039222, WO 2011/039224 and WO 2011/144647. Such devices have: an inner tank for receiving the liquid that is to be frothed, in which a rotatable stirrer is positioned; an outer stand holding the tank; drive and control means which are in a cavity located between the inner tank and the outer stand, and which communicate with a switch and electrical connections located on the outer surface of the stand; and disturbance means to optimise circulation of the milk during frothing.

SUMMARY OF THE INVENTION

It is a preferred object of the present invention to provide a method and a device for heating a flowable food substance, such as frothing milk or a milk-based liquid, with or without frothing, while preventing or inhibiting the burning of the food substance.

The invention thus relates to a method and a device for heating a food substance, e.g. a liquid for instance a beverage, such as heating (with or without frothing) milk or a milk-based liquid. The device may be a standalone device or as a device incorporated in a food processor such as a beverage maker e.g. a coffee maker and the method may be carried out in any such device.

The device may be a standalone device, e.g. directly pluggable to the mains via an electric cord, or may be integrated in a food processor arranged to process other food items or to carry out different food conditioning processes, the food processor itself being generally pluggable to the mains via an electric cord whereas the device is a sub-part of the food processor. Such a food processor may be a beverage maker, for instance a coffee maker, e.g. a beverage maker configured to prepare a beverage (such as coffee) from an ingredient capsule.

Standalone and integrated associations of milk processing device and coffee makers are for example disclosed in WO 2006/050900, WO 2008/142154, WO 2009/074555, WO 2010/023312 and WO 2010/023313.

The machine can thus be a milk frother which operates by incorporating finely divided gas bubbles, e.g. air bubbles, into milk. When the machine is configured for incorporating gas bubbles into the milk, it may include an operating mode without incorporation of gas bubbles. However, for the purpose of the present invention a frothing function is optional. If provided, frothing can be performed with or, if so configured, even without heating.

Generally speaking, the invention relates to a method for preventing or inhibiting during a heating process, with or without frothing, burning in a food heating device of a flowable food substance, such as milk or a milk-based liquid, against a heating surface delimiting or contained in a device's cavity that contains the food substance.

The cavity may be formed by a container. The container may be provided with an optional lid for confining the food substance within the cavity for dipping in the food substance.

The heating surface may form a bottom wall and/or a sidewall of the cavity which is exposed to the food substance.

The heating surface can be formed by a heating body that is contained, e.g. suspended in the cavity or fixed in the cavity.

The heating device has an agitator movable in the cavity.

The method comprises the steps of: introducing the flowable food substance into the cavity; heating the heating surface and moving the agitator at an agitator speed to generate in the cavity a flow of the food substance over the heating surface and in contact therewith, the agitator being for instance driven by a motor; disturbing the flow of the food substance to break and/or cause asymmetric flow of the food substance in the cavity.

Typically, the heating of the heating surface, the moving of the agitator and the disturbance of the flow are carried out generally at the same time.

The heating device may incorporate any of the features disclosed in WO 2006/050900, WO 2008/142154, WO 2009/074555, WO 2010/023312, WO 2010/023313, WO 2011/144647, EP 2015172387, EP 2015172393, EP 2015172386, EP 2015172389 and EP 2015172392.

At a first agitator speed during the heating process, the food substance is caused to flow at different first relative local speeds over the heating surface. Hence, the heating surface includes faster speed locations (typically close to the agitator) as well as a first minimum speed location (different to the faster speed locations) over which the food substance flows at a first minimum speed of the different first relative local speeds.

Since the food flows slowest at the first minimum speed location, this location benefits from the least heat evacuation by the flowing food substance. Hence, it is this location that is exposed to the highest temperature increase and that is thus most exposed to burning of the food substance thereagainst.

The other locations of the heating surface are exposed to food substance flowing at a higher speed than the first minimum speed and are thus less likely to cause burning of the food substance.

In accordance with the invention, the speed of the agitator is changed during the heating process to a second speed. The food substance is caused to flow at different second relative local speeds over the heating surface that includes a second minimum speed location over which the food flows at a second minimum speed of the different second relative local speeds. The second minimum speed location is different to the first minimum speed location.

Without being bound to any theory, it is believed that the disturbance of the flow of the food substance causes this shift of the location on the heating surface of the minimum speed of the flow when the speed of the agitator is changed. The overall structure of the flow of the food substance changes when the speed of the agitator is changed. By displacing the minimum speed locations of the heating surface, a location that is poorly cooled at one speed of the agitator will be better cooled at another speed of the agitator. Hence, by intermittently changing the speed of the agitator, the burning of the food substance is less likely to occur or, if it occurs, it will occur at a later point in time than if the speed of the agitator had been maintained constant.

The different speed locations and the corresponding speeds will of course depend on the geometry of the cavity, the geometry of the agitator and its speed, the quantity and viscosity of the food substance. For implementing the invention, it is not essential to determine precisely the location and value of the relative speeds over the heating surface. It is the shift during the heating process of the minimum speed location which prevents or inhibits the burning of the food substance against the heating surface.

A minimum speed location may be understood as an area of the heating surface that experiences at a given point in time the lowest temperature range that extends over span of about 1 or 2° C.

The minimum speed location will be shifted by the change of speed of the agitator. It may also be shifted over time by a change of viscosity, especially in the case of frothing, of the food substance.

For instance, the different minimum speed locations are spaced apart by a distance of at least 2 mm or at least 3 mm, such as at least 7 mm or at least 8 mm, e.g. at least 15 mm or at least 30 mm.

The heating device can have an electrically powered chamber adjacent to the cavity. For instance, the chamber has at least one of: a power connector for powering the device; a control unit connected to a user-interface for controlling the device; an electric heater for heating the heating surface; a temperature sensor for sensing a temperature of the heating surface; and an electric motor for driving the agitator, such as a motor having an output axle and a magnetic coupling for driving magnetically the agitator. For instance, the chamber has a control unit controlling the powering of the motor and of the electric heater e.g. based on a timer and/or the temperature sensor.

The agitator may thus be controlled based on a timing and/or a temperature or based on another parameter, e.g. the viscosity of the food substance that can be derived for example from the power consumption of the motor.

During the heating process, the agitator can be moved at a third agitator speed associated with third different relative local speeds of the food substance over the heating surface that includes a third minimum speed location that is different to the first and the second minimum speed locations. For instance, during the heating process the agitator is moved at a fourth agitator speed associated with fourth different relative local speeds of the food substance over the heating surface that includes a fourth minimum speed location that is different to the first, second and third minimum speed locations. It is possible to provided additional agitator speeds, e.g. fifth, sixth, seventh agitator speeds, etc. . . . .

The cavity may extend generally about: a generally upright axis of revolution, the cavity being for instance a generally cylindrical or conical or spherical or elliptoidical cavity; and/or a generally upright central axis, the cavity being for instance generally pyramidal or prismatic. For example, the lower part of the cavity can be generally prismatic and an upper part can be generally cylindrical, or vice versa.

The cavity may contain at least one obstacle located or protruding into the cavity and that interferes with the flow of the food substance.

The cavity can extends generally about a generally upright axis of revolution or central axis, the agitator moving off said axis, the agitator being for instance rotated about an axis that is distant from the central axis or axis of revolution of the cavity.

Examples of such configurations (cavity with obstacle(s) and/or off-axis agitator movement) are disclosed in WO 2006/050900.

The agitator typically rotates about an axis of rotation. The agitator may include at least one impeller member that extends: radially relative to the axis of rotation, such as one or more radial baffles, e.g. for substantially frothless heating process; and/or annularly relative to the axis of rotation, such as at least one helicoidal spring in a loop around the axis of rotation, e.g. for a frothing heating process.

Radial and annular members may be combined in the same agitator that can be moved, e.g. at a lower speed, to prevent or inhibit frothing, or, e.g. at a higher speed, to cause frothing of the food substance.

The method may include the step of measuring a temperature of the food substance or of the heating surface, e.g. via a temperature sensor, and changing the speed of the agitator between the above speeds when reaching a corresponding predetermined temperature threshold.

The method can comprise the step of changing the speed of the agitator between the above speeds at a pace increasing during the heating process with an increasing measured temperature of the food substance or of the heating surface or with an increasing duration of time during the heating process.

Hence, when the temperature of a minimum speed location comes closer to the temperature of burning of the food substance, the speed of the agitator must be changed. The pace of changing the speed may increase over time during the heating process.

The first and second speeds of the agitator, and in so far as provided the third and other speeds of the agitator, can be rotational speeds within a range of 750 to 2500 RPM, such as of 800 to 2000 RPM, e.g. of 850 to 1750 RPM.

The first and second speeds of the agitator, and in so far as provided the third and other speeds of the agitator, may be within a range of speeds extending over 35% of the lowest speed of said first, second and optional third and other speeds, such as a range of speeds extending of 25%, for instance 15%, e.g. 12.5% of said lowest speed.

Hence, even a relatively small change of speed of the agitator may be sufficient to shift enough the minimum speed location of the heating surface.

The first and second speeds of the agitator, and in so far as provided the third and other speeds of the agitator, can be within a range of 850 to 1400 RPM, such as 950 to 1250 RPM.

In an embodiment of the method, at least two different speeds of the agitator are provided. The agitator speeds are carried out in the following order:
the first speed that is a lowest speed, e.g. in the range of about 930 to 1000 RPM, the first speed being optionally carried out until a temperature of the food substance or of the heating surface of about 35 to 42° C. is measured; and
the second speed that is a highest speed, e.g. in the range of about 1060 to 1160 RPM, the second speed being optionally carried out until a temperature of the food substance or of the heating surface of about 62 to 75° C. is measured, This first embodiment of the method may be carried out for frothing the food substance, e.g. milk or milk-based liquid, during the heating process.

In another embodiment of the method, at least four different speeds of the agitator are provided. The agitator speeds are carried out in the following order:
the first speed that is a highest speed, e.g. in the range of about 1100 to 1150 RPM, the first speed being optionally carried out until a temperature of the food substance or of the heating surface of about 27 to 33° C. is measured;
the second speed that is a lowest speed, e.g. in the range of about 1000 to 1050 RPM, the second speed being optionally carried out until a temperature of the food substance or of the heating surface of about 42 to 48° C. is measured;
the third speed that is an intermediate lower speed, e.g. in the range of about 1050 to 1090 RPM, the third speed being optionally carried out until a temperature of the food substance or of the heating surface of about 52 to 58° C. is measured; and
the fourth speed that is an intermediate higher speed or is equivalent to the first speed, e.g. in the range of about 1090 to 1140 RPM, the fourth speed being optionally carried out until a temperature of the food substance or of the heating surface (6) of about 60 to 68° C. is measured, This second embodiment of the method may be carried out for inhibiting or preventing the frothing of the food substance, e.g. milk or milk-based liquid, during the heating process.

Generally speaking, when reference is made to lowest or lower agitator speed, it is a target speed, e.g. a generally steady-state agitator speed, when the agitator is moved. It does not include the agitator's zero-speed or start-up speed. Hence, the lowest or lower agitator speed does not refer to the short start-up period when the initial speed is zero or a transitional increasing speed from the zero speed to the target speed.

At least one speed of the first, the second speed of the agitator, and in so far as provided the third and other speeds of the agitator, can be repeated during the heating process, the repetition being typically spaced apart in time. For instance, the different agitator speeds are carried out in an order that is partly or completely repeated at least once.

The agitator can be moved substantially permanently during the heating process, for example without intermittent interruption.

The agitator may be moved prior to heating of the heating surface, such as for a period of time of 3 to 15 sec, e.g. 5 to 10 sec, before the heating of the heating surface.

The agitator can be moved after heating of the heating surface has ended, such as for a period of time of 0.1 to 5 sec, e.g. 0.5 to 2.5 sec., after the heating has ended.

Delaying the heating of the heating surface after starting motion of agitator and/or delaying the immobilization of the agitator after the heating of the heating surface is ended can be carried out to minimize time dependent influences at the beginning and/or at the end of the heating process.

Starting the agitation of the food substance prior to heating will prevent that the food substance is static on the heating surface (that would lead to the worst heat evacuation from the heating surface to the food substance). Maintaining the agitator in movement after the heating surface is no more heated, e.g. because the target temperature has been reached, will provide the release of heat (that is at a maximum) from the heating surface into the food substance with no or minimal local overheating.

The invention also relates to a device for heating a flowable food substance, such as milk or a milk-based liquid, having: a cavity for receiving the food substance; a heating surface delimiting or contained in the cavity for heating the food substance when in the cavity; and an agitator for generating a flow of the food substance over the heating surface when the food substance is in the cavity, whereby the food substance is heated by a transfer of heat from the heating surface to the food substance.

The cavity, the heating surface and the agitator are configured to carry out a method as described above when the cavity contains the food substance.

In an embodiment, the device also includes a mode of operation for frothing the food substance without heating thereof.

BRIEF DESCRIPTION OF THE DRAWINGS

The invention will now be described with reference to the schematic drawings, wherein.

DETAILED DESCRIPTION

Figure 1:
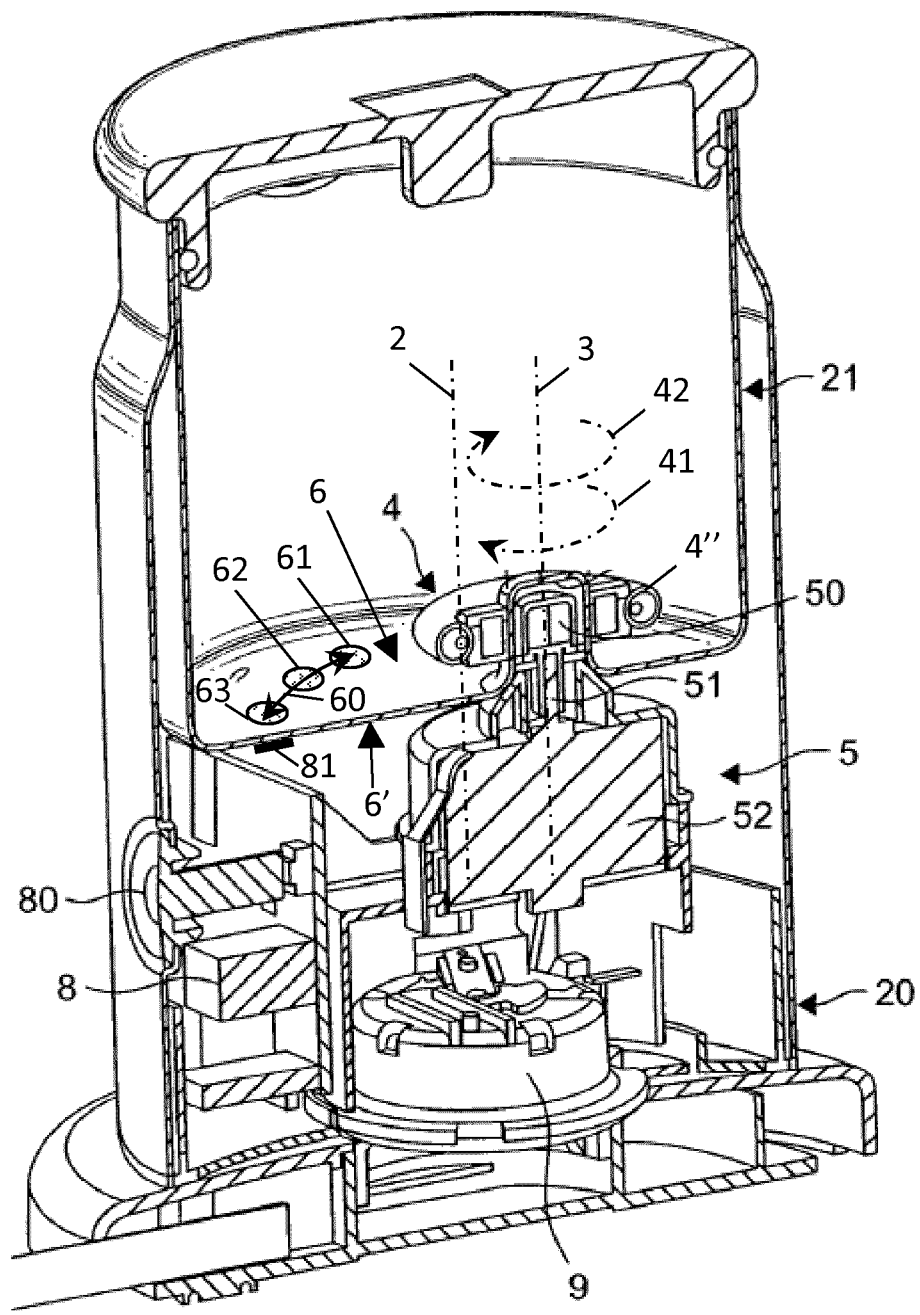
FIG. 1 is a cross-sectional perspective view a heating device for carrying out the method according to the invention with an agitator of a first type.
Figure 2:
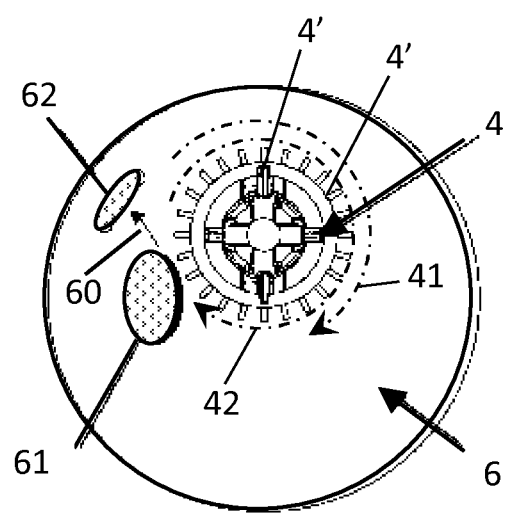
FIG. 2 is a view from above of another heating device for carrying out the method according to the invention with an agitator of a second type.

FIGS. 1 and 2, in which the same numeric references generally designate the same elements, show two embodiments of a heating device 20 for carrying out the method of the invention, including heating of a flowable food substance, such as milk or a milk-based liquid.

Device 20 has: a cavity 21 for receiving the food substance; a heating surface 6 delimiting or contained in cavity 21 for heating the food substance when in cavity 21; and an agitator 4 for generating a flow of the food substance over the heating surface 6 when the food substance is in cavity 21, thereby heating the food substance by transferring heat from heating surface 6 to the food substance. Such device 20 may also include a mode of operation for frothing the food substance without heating thereof, e.g. as taught in WO 2008/142154.

For instance, heating device 20 includes an electrically powered chamber 5 adjacent to cavity 21, such as a chamber 5 having at least one of: a power connector 9 for powering device 20; a control unit 8 connected to a user-interface 80 for controlling device 20; an electric heater 6' for heating heating surface 6, e.g. an electric heater 6' in the form of a printed resistor circuit or thick film heater or an inductively heated member; a temperature sensor 81 for sensing a temperature of heating surface 6; and an electric motor 52 for driving agitator 4, such as a motor having an output axle 51 and a magnetic coupling 50 for driving magnetically agitator 4. For example, chamber 5 contains a control unit 8 controlling the powering of motor 52 and of electric heater 6' e.g. based on a timer and/or a temperature sensed by temperature sensor 81.

The method of the invention can be implement by using device 20. The method is arranged for preventing or inhibiting during a heating process, with or without frothing, burning in heating device 20 of a flowable food substance, such as milk or a milk-based liquid, against heating surface 6 which delimits or is contained in cavity 21 that contains the food substance.

To carry out the method of the invention, the flowable food substance is introduced into cavity 21. Heating surface 6 is heated. Agitator 4 is moved at an agitator speed 41,42 to generate in cavity 21 a flow of the food substance over heated surface 6 and in contact therewith. For instance, agitator 4 is driven by a motor 5. The flow of the food substance is disturbed so as to break the flow of the food substance in cavity 21 and/or cause the flow of the food substance in cavity 21 to be asymmetric 21.

At a first agitator speed 41 during the heating process, the food substance is caused to flow at different first relative local speeds over heating surface 6 that includes a first minimum speed location 61 over which the food substance flows at a first minimum speed of the different first relative local speeds.

During the heating process, the speed of agitator 4 is changed to a second speed 42, the food substance being caused to flow at different second relative local speeds over heating surface 6 that includes a second minimum speed location 62 over which the food flows at a second minimum speed of the different second relative local speeds. The second minimum speed location 62 is different to the first minimum speed location 61.

For instance, the different minimum speed locations 61,62,63 are spaced apart by a distance 60 of at least 2 mm or at least 3 mm, such as at least 7 mm or at least 8 mm, e.g. at least 15 mm or at least 30 mm.

During the heating process, agitator 4 can be moved at a third agitator speed associated with third different relative local speeds of the food substance over heating surface 6 that includes a third minimum speed location 63 that is different to the first and the second minimum speed locations 61,62. For instance, during the heating process agitator 4 is moved at a fourth agitator speed associated with fourth different relative local speeds of the food substance over the heating surface 6 that includes a fourth minimum speed location that is different to the first, second and third minimum speed locations.

Cavity 21 may extend generally about a generally upright axis of revolution 2. For instance, cavity 21 is a generally cylindrical or conical or spherical or elliptoidical cavity 21.

The cavity 21 can have a generally upright central axis 2. For instance, the cavity is generally pyramidal or prismatic.

The cavity may contain at least one obstacle that is located or protruding into the cavity and that interferes with the flow of the food substance.

Cavity 21 may extend generally about a generally upright axis of revolution 2 or central axis 2, agitator moving off such axis 2. For instance, agitator 4 is rotated about an axis 3 that is distant from central axis 2 or from axis 2 of revolution of cavity 21.

Agitator 4 can rotate about an axis of rotation 3.

Agitator 4 may have at least one impeller member extending radially relative to axis of rotation 3, such as one or more radial baffles 4', e.g. for a substantially frothless heating process. See FIG. 2.

Agitator 4 may have at least one impeller member extending annularly relative to axis 3 of rotation, such as at least one helicoidal spring 4" in a loop around axis 3 of rotation e.g. for a frothing heating process. See FIG. 1.

It is also possible to combine radial baffles 4' and an annular member 4". In such a case, frothing can be obtained by moving, e.g. rotating, agitator at a higher speed whereas frothless heating can be achieved at a lower agitator speed. See FIG. 2.

The temperature of the food substance or of the heating surface 6 can be measure, e.g. via a temperature sensor 81. The speed of agitator 4 may be changed between the above indicated speeds 41,42 when reaching a corresponding predetermined temperature threshold.

The speed of agitator 4 between the above indicated speeds 41,42 may be changed at a pace increasing during the heating process with an increasing measured temperature of the food substance or of heating surface 6 or with an increasing duration of time during the heating process.

First and second speeds 41,42 of agitator 4 and, in so far as provided the third and other speeds of agitator 4, can be rotational speeds within a range of 750 to 2500 RPM, such as of 800 to 2000 RPM, e.g. of 850 to 1750 RPM.

First and second speeds 41,42 of agitator 4 and, in so far as provided the third and other speeds of the agitator 4, can be within a range of speeds extending over 35% of the lowest speed of the first, second and optional third and other speeds, such as a range of speeds extending of 25%, for instance 15%, e.g. 12.5% of the lowest speed.

First and second speeds 41,42 of agitator 4 and, in so far as provided the third and other speeds of the agitator 4, can be within a range of 850 to 1400 RPM, such as 950 to 1250 RPM.

At least two different speeds 41,42 of agitator 4 are provided and wherein agitator speeds 41,42 are carried out in the following order:
- first speed 41 that is a lowest speed, e.g. in the range of about 930 to 1000 RPM, first speed 41 being optionally carried out until a temperature of the food substance or of heating surface 6 of about 35 to 42° C. is measured; and
- second speed 42 that is a highest speed, e.g. in the range of about 1060 to 1160 RPM, second speed 42 being optionally carried out until a temperature of the food substance or of heating surface 6 of about 62 to 75° C. is measured, Such heating process can be a heating process with frothing of the food substance.

At least four different speeds of agitator 4 can be provided, the agitator speeds are carried out in the following order:
- the first speed that is a highest speed, e.g. in the range of about 1100 to 1150 RPM, the first speed being optionally carried out until a temperature of the food substance or of heating surface 6 of about 27 to 33° C. is measured;
- the second speed that is a lowest speed, e.g. in the range of about 1000 to 1050 RPM, the second speed being optionally carried out until a temperature of the food substance or of heating surface 6 of about 42 to 48° C. is measured;
- the third speed that is an intermediate lower speed, e.g. in the range of about 1050 to 1090 RPM, the third speed being optionally carried out until a temperature of the food substance or of heating surface 6 of about 52 to 58° C. is measured; and
- the fourth speed that is an intermediate higher speed or is equivalent to the first speed, e.g. in the range of about 1090 to 1140 RPM, the fourth speed being optionally carried out until a temperature of the food substance or of the heating surface 6 of about 60 to 68° C. is measured.

Such heating process can be a heating process substantially without frothing of the food substance.

At least one speed of first 41, second speed 42 of the agitator 4 and, in so far as provided the third and other speeds of agitator 4, may be repeated during the heating process, the repetition being typically spaced apart in time. For instance, the different agitator speeds 41,42 are carried out in an order that is partly or completely repeated at least once.

Agitator 4 can be moved substantially permanently during the heating process, for example without intermittent interruption.

Agitator 4 may be moved prior to heating of the heating surface 6, such as for a period of time of 3 to sec, e.g. 5 to 10 sec, before the heating of the heating surface; and/or after heating of the heating surface has ended, such as for a period of time of 0.1 to 5 sec, e.g. 0.5 to 2.5 sec., after the heating has ended.

The invention claimed is:

1. A method for preventing or inhibiting during a heating process, with or without frothing, burning in a food heating device of a milk or a milk-based liquid as a flowable food substance, against a heating surface delimiting or contained in a cavity of the food heating device that contains the flowable food substance, the food heating device comprising an agitator movable in the cavity, the method comprising:
    introducing the flowable food substance into the cavity;
    heating the heating surface and moving the agitator at an agitator speed to generate in the cavity a flow of the food substance over the heated surface and in contact therewith, optionally the agitator being driven by a motor; and
    preventing or inhibiting burning in the food heating device of the food substance by disturbing the flow of the food substance to break and/or cause asymmetric flow of the flowable food substance in the cavity, and the disturbing the flow of the food substance comprises:
    moving the agitator at a first agitator speed during the heating process such that the food substance is caused to flow at different first relative local speeds over the heating surface that includes a first minimum speed location over which the food substance flows at a first minimum speed of the different first relative local speeds; and
    changing the speed of the agitator during the heating process to a second speed to prevent or inhibit burning in the food heating device of the flowable food substance, the food substance being caused to flow at different second relative local speeds over the heating surface that includes a second minimum speed location over which the food flows at a second minimum speed of the different second relative local speeds,
    the second minimum speed location being at a different location along the heating surface than the first minimum speed location.

2. The method of claim 1, wherein during the heating process the agitator is moved at a third agitator speed associated with third different relative local speeds of the food substance over the heating surface which includes a third minimum speed location that is different to the first and the second minimum speed locations.

3. The method of claim 1, wherein the cavity extends generally about:
    a generally upright axis of revolution, the cavity being a generally cylindrical or conical or spherical or elliptoidical cavity; and/or
    a generally upright central axis, the cavity being generally pyramidal or prismatic.

4. The method of claim 1, wherein the cavity:
    contains at least one obstacle that is located or protruding into the cavity and that interferes with the flow of the food substance; and/or
    extends generally about a generally upright axis of revolution or central axis, the agitator moving off the axis, the agitator being rotated about an axis that is distant from the central axis or from the axis of revolution of the cavity.

5. The method of claim 1, wherein the agitator rotates about an axis of rotation, the agitator comprising at least one impeller member extending radially relative to the axis of rotation.

6. The method of claim 1, comprising measuring a temperature of the food substance or of the heating surface, and changing the speed of the agitator between the speeds when reaching a corresponding predetermined temperature threshold.

7. The method of claim 1, comprising changing the speed of the agitator between the speeds at a pace increasing during the heating process with an increasing measured temperature of the food substance or of the heating surface or with an increasing duration of time during the heating process.

8. The method of claim 1, wherein the first and second speeds of the agitator are rotational speeds within a range of 750 RPM to 2500 RPM.

9. The method of claim 1, wherein the first and second speeds of the agitator are within a range of speeds having a lowest speed and a highest speed, the highest speed at least equal to 1.35 times of the lowest speed of the first and second speeds.

10. The method of claim 1, wherein the first and second speeds of the agitator are within a range of 850 RPM to 1400 RPM.

11. The method of claim 1, wherein at least two different speeds of the agitator are provided and wherein the agitator speeds are carried out in the following order:
the first speed that is a lowest speed; and
the second speed that is a highest speed.

12. The method of claim 1, wherein at least four different speeds of the agitator are provided and wherein the agitator speeds are carried out in the following order:
the first speed that is a highest speed;
the second speed that is a lowest speed;
the third speed that is an intermediate lower speed; and
the fourth speed that is an intermediate higher speed or is equivalent to the first speed.

13. The method of claim 1, wherein the second speed of the agitator is repeated during the heating process, the repetition of the second speed being spaced apart in time.

14. The method of claim 1, wherein the agitator is moved:
during the heating process, without intermittent interruption; and/or
prior to the heating of the heating surface.

15. The method of claim 1, wherein the first minimum speed location is spaced apart along the heating surface from the second minimum speed location by a distance within a range of 2 mm to 3 mm.

16. The method of claim 1, wherein the first minimum speed location is spaced apart along the heating surface from the second minimum speed location by a distance within a range of 7 mm to 8 mm.

17. The method of claim 1, wherein the changing the speed of the agitator comprises a step selected from the group consisting of:
(i) moving the agitator at the first speed until a temperature of at least one of the food substance or the heating surface is within a first predetermined range; and
moving the agitator at the second speed, which is higher than the first speed, until the temperature of the at least one of the food substance or the heating surface is within a second predetermined range that is higher than the first predetermined range; and
(ii) moving the agitator at the first speed until a temperature of at least one of the food substance or the heating surface is within a first predetermined range;
moving the agitator at the second speed, which is lower than the first speed, until the temperature of the at least one of the food substance or the heating surface is within a second predetermined range that is higher than the first predetermined range;
moving the agitator at a third speed, which is between the first and second speeds, until the temperature of the at least one of the food substance or the heating surface is within a third predetermined range that is higher than the second predetermined range; and
moving the agitator at a fourth speed, which is higher than the third speed and no greater than the first speed, until the temperature of the at least one of the food substance or the heating surface is within a fourth predetermined range that is higher than the third predetermined range.

18. The method of claim 17, wherein the first speed of the first group is within a range of 930 RPM to 1000 RPM, the first predetermined range of the first group is within a range of 35° C. to 42° C., the second speed of the first group is within a range of 1060 RPM to 1160 RPM, and the second predetermined range of the first group is within a range of 62° C. to 75° C.

19. A device for heating a milk or a milk-based liquid as a flowable food substance, the device comprising:
a cavity for receiving the food substance;
a heating surface delimiting or contained in the cavity for heating the food substance when in the cavity;
an agitator for generating a flow of the food substance over the heating surface when the food substance is in the cavity,
wherein the cavity, the heating surface and the agitator are configured to perform a method comprising:
introducing the flowable food substance into the cavity;
heating the heating surface and moving the agitator at an agitator speed to generate in the cavity a flow of the food substance over the heated surface and in contact therewith, optionally the agitator being driven by a motor;
preventing or inhibiting burning in the food heating device of the flowable food substance by disturbing the flow of the food substance to break and/or cause asymmetric flow of the food substance in the cavity, and the disturbing the flow of the food substance comprises:
moving the agitator at a first agitator speed during the heating process, the food substance is caused to flow at different first relative local speeds over the heating surface that includes a first minimum speed location over which the food substance flows at a first minimum speed of the different first relative local speeds; and
changing the speed of the agitator during the heating process to a second speed to prevent or inhibit burning in the food heating device of the flowable food substance, the food substance being caused to flow at different second relative local speeds over the heating surface that includes a second minimum speed location over which the food flows at a second minimum speed of the different second relative local speeds,
the second minimum speed location being at a different location along the heating surface than the first minimum speed location.

* * * * *